(No Model.)
A. B. BOGGS.
Plow Clearer.
No. 236,298.   Patented Jan. 4, 1881.
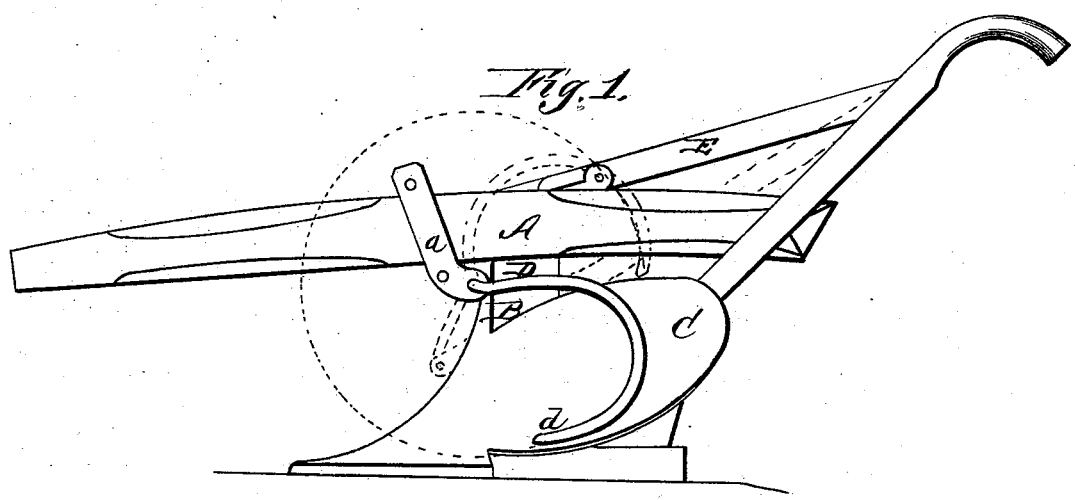
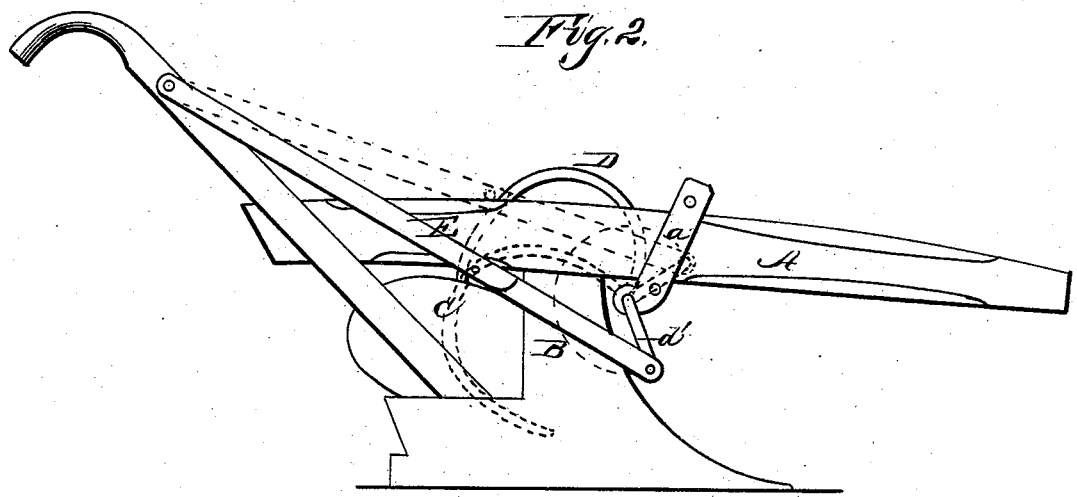
Witnesses:
Inventor:
Alden B. Boggs.
per
J. H. Alexander,
Attorney.

UNITED STATES PATENT OFFICE.

ALDEN B. BOGGS, OF COVINGTON, OHIO.

PLOW-CLEARER.

SPECIFICATION forming part of Letters Patent No. 236,298, dated January 4, 1881.

Application filed July 12, 1880. (No model.)

*To all whom it may concern:*

Be it known that I, ALDEN B. BOGGS, of Covington, in the county of Miami and State of Ohio, have invented certain new and useful Improvements in Plow-Clearers; and I do hereby declare that the following is a full, clear, and exact description thereof, reference being had to the accompanying drawings, and to the letters of reference marked thereon, which form part of this specification, in which—

Figure 1 is a side view with the clearer dotted in position after being used. Fig. 2 is a reverse view with the clearer shown in the position after using, and dotted in position for use.

My invention relates to devices for clearing plows from weeds; and it consists in the combination and arrangement of devices hereinafter more fully described.

In order that others may avail themselves of the benefits of my invention, I will now proceed to describe its construction and operation.

In the drawings I have shown a plow, in which A represents the beam, B the standard, and C the mold-board.

To the under side of the beam A, just in front of the standard, is an arm, D, pivoted in a clevis, $a$, secured to the beam. This arm D extends out horizontally some distance in front of the mold-board, and is bent backward and downward, forming a hook, $d$, on the end of the clearing-arm, which catches all the weeds. On the opposite side of the beam the arm is bent forward at right angles, forming a short crank-arm, $d'$, to which is attached one end of a jointed lever, E, the other end of which is pivoted to one of the plow-handles, within easy reach of the operator.

In operation the weeds and grasses gather around the standard and in the hooked arm $d$, just in front of the mold-board, and are turned under as follows: The operator lifts the inner end of the jointed lever E, which draws the outer end of said lever, with the crank-arm $d'$, toward him, throwing the clearer D forward at the same time. When the crank $d'$ has reached its farthest position toward the rear the lever E is again depressed, and the movement of the crank and clearing-arm is continued nearly a whole revolution. The weeds and grass drop off the end of the clearer and are turned under, and the crank $d'$, being fitted close to the landside, clears it during its revolution. After the weeds are cleared away the operation is reversed and the clearing-arm thrown back to its original position.

This device is simple, inexpensive, not liable to break or get out of order, and can readily be attached to any plow.

Having thus fully described my invention, what I claim as new, and desire to secure by Letters Patent, is—

1. The combination, with a plow, of the revolving arm D, formed at one end with curved arm $d$ and at the other with crank-arm $d'$, and adapted not only to collect and discharge the weeds and stalks from the mold-board, but at the same time, in its revolution, to clear the landside from adhering earth and soil, substantially as set forth.

2. In combination with a plow, a revolving clearing-arm formed with curved hook-arm $d$ and crank-arm $d'$, the latter attached to the jointed lever E, substantially as and for the purpose set forth.

3. The combination, with a plow, of jointed lever E, clevis $a$, and revolving clearing-arm D, having curved hooked arm $d$ and crank $d'$, all constructed and arranged to operate substantially as and for the purposes described.

In testimony that I claim the foregoing as my own I affix my signature in presence of two witnesses.

ALDEN B. BOGGS.

Witnesses:
D. J. MARTIN,
WM. FRESHOUR.